United States Patent [19]
Betz et al.

[11] 4,230,745
[45] Oct. 28, 1980

[54] METHOD OF ENCAPSULATING A MOLDED CERAMIC MEMBER

[75] Inventors: Wolfgang Betz, Munich; Axel Rossmann, Karlsfeld, both of Fed. Rep. of Germany

[73] Assignee: Motoren- und Turbinen-Union Munchen GmbH, Munich, Fed. Rep. of Germany

[21] Appl. No.: 930,725

[22] Filed: Aug. 3, 1978

[30] Foreign Application Priority Data

Aug. 18, 1977 [DE] Fed. Rep. of Germany ...... 2737209

[51] Int. Cl.$^2$ .............. C23C 11/00; C23C 13/00; B05D 3/00
[52] U.S. Cl. .............. 427/255.4; 427/255; 427/294; 427/344
[58] Field of Search .............. 427/94, 294, 248 E, 427/255, 344

[56] References Cited
U.S. PATENT DOCUMENTS

| | | | |
|---|---|---|---|
| 2,618,565 | 11/1952 | Nicholson | 106/44 |
| 3,503,798 | 3/1970 | Yoshioka et al. | 427/94 |
| 3,520,722 | 7/1970 | Scott | 427/94 |
| 3,928,662 | 12/1975 | Kaneko et al. | 427/294 |

OTHER PUBLICATIONS

Milek, John T., *Silicon Nitride for Microelectronic Applications*, 1971.

*Primary Examiner*—Michael R. Lusignan
*Attorney, Agent, or Firm*—Scully, Scott, Murphy & Presser

[57] ABSTRACT

For the encapsulation of a molded ceramic member for high-temperature isostatic pressing, the molded member, which preferably is of silicon ceramic, is covered with a dense surface coating of an Si melt. Thereafter, the coating is exposed to an $N_2$ atmosphere at a temperature of within about 800° to 1400° C. for so long until the Si coating is converted into a $Si_3N_4$ coating.

4 Claims, No Drawings

METHOD OF ENCAPSULATING A MOLDED CERAMIC MEMBER

BACKGROUND OF THE INVENTION

1. Field of the Invention

The present invention relates to a method for encapsulating a molded member of ceramic, particularly a silicon ceramic material for high-temperature isostatic pressing.

During high-temperature isostatic pressing (HIP), porous molded members of silicon ceramic materials are compressed under the concurrent application of high pressure acting on all sides thereof and high temperature. High-temperature isostatic pressing facilitates improvement in the mechanical strength at elevated temperature, as well as the resistance to oxidation through a reduction in the porosity of the molded members. The pressures which are applied during high-temperature isostatic pressing (HIP) are in a magnitude of 3000 bar, with temperature being about 1750° C. Gas is usually employed as the pressure-transmissive medium. In order to prevent this gas from penetrating into the pore structure of the molded member, the latter must be encapsulated in a pressure-tight manner.

2. Discussion of the Prior Art

Heretofore, this encapsulation has been effected in a manner wherein the molded member is enclosed in an evacuated glass container, whereby the glass container assumes a viscous state during the high-temperature isostatic pressing and adheres to the molded ceramic member in the form of a glass coating.

In this known method for the encapsulating of the molded ceramic member, there is present the danger of the glass coating penetrating into the pore structure of the molded member at too low a viscosity of the glass container melting during the high-temperature isostatic pressing whereby, depending upon circumstances, this will impair the strength of the molded member in the surface region thereof. Furthermore, due to excessive penetration of the highly-fluid glass into the pore structure of the molded member, such an intimate bond can be produced between the glass coating and the molded member that it may be unavoidable to prevent damage being sustained by molded ceramic members, particularly those with complex, thin-walled configurations, during removal of the glass envelope after the high-temperature isostatic pressing. On the other hand, there is encountered the danger that at too high a viscosity of the glass container melted during high-temperature isostatic pressing and the resultant glass coating adhering to the molded ceramic member, there will occur deformations of the molded ceramic member, which are absolutely to be avoided.

SUMMARY OF THE INVENTION

Accordingly, it is a primary object of the present invention to provide a method for encapsulating a molded member of ceramic, by means of which it is possible to achieve a pressure-tight encapsulation of the molded member, and concurrently to maintain the original geometric shape of the molded ceramic member as precisely as possible.

It is a more specific object of the present invention to provide a method of the type described in which the molded member is coated with a dense surface layer of molten Si and is then exposed to an N2 atmosphere at 800° to 1400° C. for so long until the Si coating has been converted into a Si3N4 coating.

DETAILED DISCUSSION

Inasmuch as in the inventive method the capsule material is molded onto the molded ceramic member already prior to commencement of the high-temperature isostatic pressing and is merely compressed together therewith, there is obviated the danger of an unwanted deformation of the molded member by the encapsulating coating during high-temperature isostatic pressing. This allows even for the manufacture of complicated geometric shapes, such as bladed turbine rotor wheels. A further advantage of the inventive method resides in that the encapsulating coating need not be removed after the high-temperature isostatic pressing since it likewise is constituted of silicon ceramic.

Preferably, the coating sequence should be carried out under a vacuum so as to avoid undesirable chemical reactions with a gas possibly trapped in the pore structure of the molded member during high-temperature isostatic pressing.

In accordance with a further feature of the inventive method, the molded member is filled with N2 prior to the application of the silicon melt, and the Si melt is infiltrated into the pore structure of the molded member under a low positive pressure of about 1 bar.

In this method, the silicon layer can penetrate further into the surface of the molded member, meaning that there can be produced a thicker and thereby more dense encapsulating coating or layer. The complete conversion of the silicon coating into silicon nitride is ensured in that the chemical reaction will be effected from both sides of the coating, meaning from the interior of the molded member as well as from its surface.

Preferably, pursuant to the above-described inventive method, additives such as 1% to 10% MgO may be introduced to the silicon melt in order to improve the viscosity thereof. Attained hereby is that the forming silicon nitride coating will be able to conform, without breaking, to the change in shape of the molded member taking place during high-temperature isostatic pressing.

What is claimed is:

1. In a method for encapsulating a molded member of ceramic, such as silicon ceramic for high-temperature isostatic pressing; the improvement comprising coating said molded member with a dense surface coating of Si melt; and thereafter exposing said coating to an N2 atmosphere at a temperature in the range of about 800° C. to 1400° C. until the Si coating is converted into a Si3N4 coating.

2. Method as claimed in claim 1, comprising evacuating said molded member prior to the coating thereof with said Si melt.

3. Method as claimed in claim 1, comprising filling said molded member with N2 prior to coating thereof with said Si melt; and infiltrating the Si melt into the pore structure of the molded member under a low positive pressure of about 1 bar.

4. Method as claimed in any one of the preceding claims, comprising adding about 1% to 10% MgO to the Si melt so as to improve the viscosity thereof.

* * * * *